United States Patent [19]

Stayner et al.

[11] 3,920,603
[45] Nov. 18, 1975

[54] REINFORCED RESIN COMPOSITIONS AND ARTICLES FORMED THEREOF

[76] Inventors: Vance A. Stayner; Barry L. Sloss, both of P.O. Box 63, Sugar Grove, Ill. 60554

[22] Filed: Oct. 24, 1973

[21] Appl. No.: 401,208

[52] U.S. Cl............................... 260/40 R; 106/291
[51] Int. Cl.$^2$..................... C08K 7/20; C08L 67/06
[58] Field of Search................. 260/40 R; 106/291

[56] References Cited
UNITED STATES PATENTS

| | | | |
|---|---|---|---|
| 2,897,732 | 8/1959 | Shuger | 260/40 R X |
| 2,978,340 | 4/1961 | Veatch et al. | 260/40 R X |
| 3,036,023 | 5/1962 | Rogers et al. | 260/40 R X |
| 3,046,851 | 7/1962 | de Vries | 260/40 R X |
| 3,153,005 | 10/1964 | Minter | 260/40 R |

OTHER PUBLICATIONS

English Mica Co., "Industrial Applications of Mica," pamphlet dated 1950, pp. 3 & 6.

W. J. Connolly et al., "Aluminum Hydrate filler in Polyester Systems," *Modern Plastics*, Vol. 43, No. 2, (1965) pp. 154, 156, & 202.

*Primary Examiner*—Donald E. Czaja
*Assistant Examiner*—S. M. Person
*Attorney, Agent, or Firm*—John L. Parker, Esq.

[57] ABSTRACT

Reinforced synthetic polyester resin compositions are provided having 10 to 60 percent by weight of resin, 1 to 30 percent by weight of glass spheres, 10 to 60 percent by weight of Suzorite mica platelets, and 20 to 70 percent by weight of aluminum trihydrate particles. The compositions may be applied to a mold or to a plastic sheet. They do not require glass fibers, and thus avoid the laborious rolling down of fibers carried on the surface of freshly applied glass fiber-resin compositions. Yet, articles formed from the compositions of the invention retain or improve upon the physical properties inherent in glass fiber-resin compositions.

5 Claims, No Drawings

REINFORCED RESIN COMPOSITIONS AND ARTICLES FORMED THEREOF

DESCRIPTION OF THE INVENTION

This invention relates generally to reinforced resin compositions and articles formed thereof, and more particularly concerns such compositions and articles having improved physical and application properties.

Various techniques have been employed in reinforcing polyester resins to form construction materials having desirable strength, impact resistance, and other properties necessary for a large variety of products such as boats, bathtubs, furniture and the like. Typically, a mold of the desired product shape is sprayed with a gel coat, polyester resin and reinforcing glass fibers are sprayed onto the coated mold to build up a thickness sufficient to provide structural integrity, the resin is cured, and finally the molded reinforced resin product is released from the mold. In other applications, the polyester resin and reinforcing glass fibers are sprayed onto sheets of synthetic resins.

One such process is that disclosed in Stayner U.S. Pat. No. 3,582,388, in which the resin composition includes glass fibers, glass beads and an inert organic solvent diluent for the resin. Another prior art process is exemplified by Brown U.S. Pat. No. 3,158,528 in which the resin composition includes glass flakes and mica particles. Still another process, disclosed in Canadian Pat. No. 893,163, concerns a resin composition incorporating mica platelets.

In conventional spraying systems, a spray gun such as the "Glas-Craft" gun is employed. Typically, the gun pumps resin through one orifice, pumps catalyst through another orifice, mixes them together and sprays the mixture out a nozzle and against a mold or plastic sheet. On top of the gun there is an air motor which drives a chopper, usually comprising a small rubber tire carrying razor type chopping blades. Glass fibers, in the form of continuous strand, are fed to the chopper, which cuts the strand into separate one to two inch long strings, which are then sprayed into the resin and thence onto the surface being coated.

One of the disadvantages to spraying glass fibers along with resin onto a mold, sheet or the like, is that the short fiber strings do not lay flat on the coating surface. Instead, many of the fiber ends protrude above the coating surface, and it becomes necessary after application of the coating to roll the glass strings or "hairs" down so that they become completely encased and lay smooth in the resin coating. It is not unusual for a single spray gun operator applying a glass fiber reinforced resin coating to be followed by two or three roller operators smoothing down the glass hairs protruding from the wet coating to thereby render the final product of acceptable quality.

Another inherent disadvantage in resin-glass fiber spraying systems is that substantial labor costs are often involved just in handling the large quantities of resin and glass fibers needed to form the product. For example, a spray gun operator laying up a large boat must use perhaps 500 pounds of glass fibers, which are conventionally available in strand form in approximately 35 pound spools. So the operator must handle and sequentially use up 10 or 15 such spools, each of which must be replaced with another when used, along with perhaps 1000–1200 pounds of resin. Then, there are the problems encountered when the chopper becomes dull through use. Periodically the chopper blades and rubber tires must be replaced. Often the operator will either run out of glass fibers in the middle of the job or the chopper will clog up. Inevitably, some resin will get onto the glass strand being pulled through the chopper, which resin dampens the rubber tire, and then the gun no longer sprays out resin and clogs up. The operator then must shut down the spray gun, take it apart, remove the glass strand from inside the gun, reassemble the gun and start up again. All of this is very time consuming and adds appreciably to the cost of manufacturing glass fiber reinforced resin articles.

It is a principal object of the present invention to provide reinforced resin compositions for coatings, and for forming articles thereof, which have improved physical and other properties, and which may be applied to a mold or sheet at a substantial savings in labor and equipment over that required in applying conventional glass fiber reinforced resins.

An ancillary object of the invention is to provide such reinforced resin compositions which may readily be applied to a mold, or to a vacuum or otherwise formed thermoplastic sheet, without use of glass fibers or a chopper gun, and without the need for time consuming and laborious rolling of a freshly applied resin surface to remove the hairs.

Another related object of the invention is to provide a reinforced resin composition having superior elasticity and other physical properties, and which when applied to a mold or other surface forms a smooth, flat surface without any hairs.

Still another object is to bring improvements to the art of spraying polyester resin and glass fibers onto vacuum formed thermoplastic sheets to rigidize such sheets by eliminating the need for glass fibers without significantly adversely affecting the physical properties of the reinforced resin composition. An allied object is to provide an improved reinforced resin composition which may readily be applied in the field using existing spray guns heretofore used with glass fiber systems.

While the invention will be described in connection with certain preferred embodiments, it will be understood that we do not intend to limit the invention to those embodiments. On the contrary, we intend to cover all alternatives, modifications and equivalents as may be included within the spirit and scope of the invention.

In carrying out the invention, we have found that a special combination of filler materials, added to the resin in particular ratios, imparts to the filled resinous composition improved physical properties and brings about a major reduction in labor costs conventionally encountered in the manufacture of articles coated with, or formed of, reinforced resins. The resinous compositions of the invention, including the particular reinforcing filler materials and proportions employed, are as follows:

A. 10 to 60% by weight of synthetic resin.
B. Reinforcing fillers comprising:
  1. 1 to 30% by weight of glass spheres.
  2. 10 to 60% by weight of Suzorite mica platelets.
  3. 20 to 70% by weight of aluminum trihydrate particles.

Any of various general purpose curable synthetic polyester resins may be used in carrying out the invention. We prefer to employ rigid, thixotropic resins which are curable at room temperatures and become rigid after curing. Particularly useful are low viscosity resins of this type which permit high filling concentrations, and which contain a compatible solvent which will render thermoplastic materials, such as acrylic sheets, acceptable to a molecular bond with the resin, so that the resin will readily adhere to the thermoplastic material.

For example we have successfully used the styrene modified polyester resins marketed by Reichhold Chemicals, Inc. known as 94-169, 94-176 and 33-082. The 94-169, resin, when filled with aluminum trihydrate and the other reinforcing materials described herein, is found to have high fire retardancy and low smoke generation. Prior to filling with reinforcing materials, this resin has a viscosity of about 100 centipoise, and a specific gravity of 1.09–1.12; after filling, the viscosity increases to the 1000–1200 centipoise range and the specific gravity to 1.50–1.54. As such, the filled resin may readily be applied to a mold or article to be coated using conventional spraying equipment, such as with a Glas-Craft gun.

The 94-176 and 33-082 resins both possess superior bonding properties when used to coat an acrylic sheet, and the latter resin may also be used in conventional lay up applications using a gelcoat mold. Combinations of resins may be employed, if desired, to achieve optimum combinations of the characteristics of each resin.

A particular type of mica has been found to be useful in carrying out the invention. It is classified as a phlogopite mica, and the high purity ore from which it is obtained is known as Suzorite ore. Suzorite mica has a specific gravity of 2.72, a Mohs hardness of 2.5 to 3.0, a refractive index of 1.598, a very high melting point of 2960° F, an oil absorption (ASTM D281-31) of 41.5, a pH of 6.8–7.2, and is light buff in color. Its chemical analysis is as follows (in weight percentages):

| | |
|---|---|
| $SiO_2$ | 40.74 |
| $Al_2O_3$ | 15.79 |
| MgO | 20.56 |
| FeO | 7.83 |
| CaO | 0.00 |
| BaO | 0.45 |
| $TiO_2$ | 0.42 |
| $Cr_2O_3$ | 0.14 |
| MnO | 0.07 |
| $K_2O$ | 9.96 |
| $Na_2O$ | 0.46 |
| F | 2.16 |
| $H_2O+$ | 0.01 Molecular |
| $H_2O-$ | 0.01 Hygroscopic |

For use in practicing the invention, the Suzorite mica takes the form of highly uniform platelets about 1/16 inch long and having an aspect ratio, i.e., a length to thickness ratio, of from 30 to 1 up to about 180 to 1. Preferably, we employ a mixture of about 80% by weight of platelets screen sized −20+35, having a bulk density of 16.12 lb. per cu. ft., and with an aspect ratio of 30 to 1 up to 60 to 1, and 20% by weight of platelets screen sized −35+100, having a bulk density of 10.40 lb. per cu. ft., and with a very high aspect ratio of 80 to 1 up to about 160 to 1. We have found that this mixture of Suzorite mica platelets desirably imparts to the resin a very high modulus of elasticity and high tensile strength compared with that imparted by other materials such as glass flakes. This means that less mica may be used in the overall resin composition without sacrificing elasticity and strength properties. The mica platelets also possess excellent oblative properties, being sound and heat reflective, and thus lend excellent acoustical and fire retardancy qualities to the resin composition. In some compositions of the invention we have found it possible to reduce the content of mica platelets by adding a minor amount of glass flakes, for example flat sized in the range of 0.028–0.056 inches and having thicknesses averaging about 0.003–0.006 inches.

One of the disadvantages to use of conventional platelet type fillers in resin compositions is that the platelets tend to spontaneously align themselves in flat planes within the resin. This results in disparate responses of the resin to stress concentrations, depending upon the direction of the source of stress in relation to the planar orientation of the platelets.

As one of the features of the invention, we avoid this uneven stress distribution problem by incorporating into the resin composite a minor proportion by weight of microscopically sized glass spheres, which are about 6 to 50 microns in diameter, with an average diameter of 30 microns. It is found that the Suzorite mica platelets and tiny glass spheres interact in the resin composition in a most effective way to bring about uniform stress distribution within the final reinforced resin composition. Thus, we find that the mica platelets tend to "whisker" the glass spheres, thereby effectively imparting a length to diameter ratio to the spheres which is functional in bringing about uniform stress distribution throughout the reinforced resin composition. The glass spheres are of a size that accomodates nestling and gives maximum compaction, as well as keeping the viscosity desirably low in the filled resin composition. We find that the glass spheres desirably improve the flow of the filler and resin combinations during processing. Sometimes we find it desirable to add ultra fine sand particles, −400 mesh size, as a portion of the glass spheres; the sand functions much like the glass spheres in the composition.

The aluminum trihydrate particles constitute an important filler ingredient in the compositions of the invention. Its primary function is to retard burning, since upon being heated it decomposes to form water which absorbs much of the smoke contribution from the flame and tends to snuff the flame. Various particle sizes of aluminum trihydrate may be employed. We prefer to use aluminum trihydrate having an average particle size of 7.4 microns (hydrometer) or 4.0 microns (Fisher), having only about 1% by weight sized +325 mesh, having a low resin demand (polyester) of 41.0 ml./100gm., a low oil absorption value (oleic acid) of 30.0 ml./100 gm., a specific gravity of 2.42, and a bulk density of about 40 lb. per cu. ft. Its typical chemical composition is:

| | |
|---|---|
| Alumina ($Al_2O_3$) | 65.0% by wt. |
| Silica ($SiO_2$) | .01 |
| Iron Oxide ($Fe_2O_3$) | .006 |
| $Na_2O$ | .15 |
| $Na_2O$ (Soluble) | .02 |
| Loss on ignition | 34.2 |

We have successfully used such materials marketed by Great Lakes Foundry Sand Company of Detroit, Michigan and known as GHA-331 Hydrate, and marketed by Aluminum Company of America, Pittsburgh, Pennsylvania and known as C-331.

We have found that by adding these particular reinforcing fillers together in the proper ratios, and then adding them to the resin, we are able to obtain a filled resin material in the 1200 centipoise viscosity range, which means that any glass fiber spray up gun conventionally used in the industry may readily be converted to the spraying of our new resin composition. And we found that our compositions when cured had excellent oblative properties, since the mica platelets act as a heat reflective material (as well as for strength reinforcement) and the aluminum trihydrate retards burning. The glass spheres impart superior stress distribution to the cured composition, resulting in high impact strength, a high strength to weight ratio, a high modulus of elasticity, and a high tensile strength. By coating our resin compositions onto a thermoplastic sheet we arrive at a laminate having unique fire retardancy and structural strength properties, yet still retaining the superior outdoor weatherability and decorativeness of the thermoplastic, and without losing the ease of mass production of the thermoplastic in the vacuum forming process.

Those skilled in the art will be able to select particular compositions from the ranges set forth above for particular end uses. That is, depending upon what properties are desired in the final product, the quantities of filler ingredients and the quantity of resin may be selected as desired.

Normally, for spray applications it is desirable for the resin to comprise about 30 to about 60 percent by weight of the composition. Since the thixotropicity of the composition increases as the resin content decreases, we find that our compositions are no longer sprayable in the 20 to 10 percent resin range; however these compositions act much like plaster or cement and are trowelable. They find use, for example, for concrete patching (where high compression value is important) or for protecting non-combustible structural materials in buildings. High aluminum trihydrate and mica platelet contents, and a low resin content in our composition, result in a material which may be troweled on a structural steel beam to provide heat protection. Such a material has superior oblative qualities, and the low resin content assures a low fuel contribution to the fire.

The glass spheres, present in amounts varying from about 1 to about 30 percent by weight of the composition, function to provide stress distribution and compression value, since they are round, spheres. The higher the proportion of glass spheres, the more stress distribution will be obtained and the greater the compression value in the resin composition.

The Suzorite mica platelets, present in amounts varying from about 10 to about 60 weight percent, act as an oblative as well as an acoustical material, since the platelets reflect much like fish scales. Thus, increasing the mica platelets will increase tensile strength and modulus of elasticity in the composition, while perhaps sacrificing some properties in compression strength.

The aluminum trihydrate particles may vary from about 20 to about 70 percent by weight of the composition. Increasing the aluminum trihydrate content increases the fire retardancy of the composition, and the higher fire rated the composition will be. However there may be some sacrifice of tensile strength and compression values, and the viscosity of the filled resin mixture will increase.

The following compositions, identified as compositions A, B, and C, are examples of our invention. In each instance the percentages by weight of the particular resins and reinforcing filler ingredients shown in the table were mixed together to form filled resin compositions, which were then sprayed onto a thermoplastic sheet which had been vacuum formed to a desired shape, and the compositions were air cured to produce a final laminated article.

|  | Examples of Resinous Compositions Percentages by Weight | | |
| --- | --- | --- | --- |
|  | A | B | C |
| Resin  94-169 | 33 |  |  |
| 94-176 |  | 61 |  |
| 33-082 |  |  | 56 |
| Glass spheres | 2 | 1 | 1 |
| Suzorite mica platelets | 30 | 17 | 10 |
| Glass flakes | — | — | 10 |
| Aluminum trihydrate particles | 35 | 21 | 23 |

Each of the resulting coatings formed of the compositions A, B and C was found to possess the desirable combination of properties described herein, including ready sprayability without need for rolling, improve flexibility while not detrimentally sacrificing other strength properties, superior stress distribution and fire retardancy properties. Composition A is a low viscosity, all purpose sprayable reinforced resin having a Class C fire rating. Composition B is particularly useful for bonding to an acrylic resin sheet. Composition C has high impact strength, will readily bond to an acrylic resin sheet, and also may be sprayed onto a conventional gelcoat mold.

In preparing our resin compositions, we dry blend the mixture of filler ingredients first. Then we add the dry blend, either immediately or at some later time, to the resin. The dry blend is prepared by placing all of the Suzorite mica platelets in a tumbler, then adding the aluminum trihydrate and glass spheres to the tumbler. The tumbler is rotated to mix the ingredients. A paddle type mixer may be used if desired.

After the solid fillers have been intimately mixed together, they are ready for mixing with the resin. Any suitable mixing arrangement may be used to blend the fillers in with the resin. Care should be taken to avoid trapping microscopic air in the resin mixture. In some instances it may be desirable to add a suitable agent capable of adding to the thixotropicity of the resin, to render the composition easier to apply to a vertical surface for example. Pigments may be added, if desired, to provide a given color in the final composition.

We have found that the filled resin compositions of the invention have excellent shelf stability, i.e. the fillers do not settle out over a period of time, even though the proportion of fillers to resin is high.

One of the advantageous features of the invention is that the resin composition described herein does not require glass fiber strings for reinforcement, so that the largest reinforcing filler used is less than about one-eighth inch in size. Accordingly it is no longer necessary for the spray operator to roll hairs (glass fibers) down after application of the composition to a mold or sheet surface. This results in significant savings in time and expense in forming resin coated articles. Neither is it necessary to employ a glass fiber chopper gun in practicing the invention, thereby avoiding the expense of such a gun and the consequent time consuming and laborious tasks of cleaning the gun after clogging.

The reinforced resin compositions of the invention have a wide variety of applications. One of the most important general applications is to enhance the properties of a thermoplastic sheet by applying to it a coating of the reinforced resin compositions of the invention. Such a thermoplastic sheet normally becomes flaccid upon being heated; but upon being coated with our resin compositions the sheet can be rendered virtually impervious to heat.

In addition, thermoplastic sheets that have high impact strength are normally pliable and have a low modulus of elasticity. Such sheets can be rendered rigid, with a high modulus of elasticity, upon being coated with our resins, without sacrificing impact properties. Other types of thermoplastic sheets that are highly brittle, but have desirable characteristics such as outdoor weatherability, may be coated with our resins to impart additional impact strength and other properties to the thermoplastic. For example, we have found the invention particularly useful for making engine shrouds, such as shrouds for outboard motor boat engines. Thermoplastic acrylic resin sheets, which have desirable weatherability and durability characteristics, may be readily heated and formed (e.g. by vacuum forming) into the shape of an engine shroud. However, on a hot day in the summertime the heat given off by the engine, taken together with the heat from the sun, tends to cause such a formed sheet to become limp and lose its shape. By coating the underside of such a formed acrylic sheet with the resin compositions of the invention, the resulting composite article is found to possess desirably low heat distortion properties and a high strength to weight ratio. The composite has excellent screw holding capacity and, in most cases, improved impact strength as compared with the uncoated thermoplastic sheet.

The resin compositions of the invention are particularly useful for forming boats, bathtubs, swimming pools, septic tanks, campers, transformer pads, telephone poles, all-terrain vehicles, playground equipment, tool boxes, car top carriers, plumbing fixtures, and feed bunkers. The compositions may also be used to form all types of furniture, camper roofs, roof vents, farm machinery, silos, planters, pallets, concrete forms, fireplaces, refrigerator doors, picnic tables, mobile homes and store facia.

We have found that by spraying a hollow core door with the reinforced resin of the invention we achieved a pallet that would not burn. This pallet was loaded with approximately 5 tons of cargo, and it did not break. Neither did the pallet break or crack after impact at 8 miles per hour with a fork lift truck. The resinous compositions of the invention are also useful in other wood coating applications. The coated woods are rendered fireproof, and are found to possess superior structural integrity. Wood railroad trestles are particularly suitable for coating with our resins.

There are also other applications for the reinforced resin compositions of the invention. For example, the compositions may be sprayed onto metal sheets or structural members to impart oblative or heat reflecting properties to the base material. Such applications have included steel plates and metal coverings for rocket engines in situations in which the steel must be protected from heat penetrating through it.

Another use is for coating concrete blocks. Spraying our compositions onto a concrete block gives it the appearance of a glazed tile, renders it impervious to dirt and moisture, and its acoustical value is so enhanced that it can be used to build a sound reflection wall and firewall. Roof decking is still another use for our invention. Our compositions reflect heat away from a roof deck surface, since they are non-combustible, very hard, durable and glassy.

In certain applications where especially high impact strength is required in the final resin coating or article, it may be desirable to include minor quantities of chopped glass fibers in the resin composition except for the surface layer (i.e. the surface layer may be devoid of glass fibers, thereby avoiding any need for rolling). As noted above, glass fibers are not required, however, in practicing the invention.

From the above description it will be seen that our invention eliminates the need for tedious handrolling of a freshly applied reinforced resin surface because glass fibers, which often make up about 30% of conventional fiber glass reinforced resins, are not required. Yet conventional spray-up equipment may still be used with our resin compositions. The compositions of the invention possess outstanding elasticity, acoustical and fire retardancy properties, and substantial savings in resin costs are possible because less resin (low viscosity) need be used than with conventional glass fiber reinforced resin compositions.

We claim as our invention:

1. A hardenable composition comprising about 10 to 60 percent by weight of a curable, synthetic polyester resin, about 1 to 30 percent by weight of microscopically sized glass spheres, about 10 to 60 percent by weight of Suzorite mica platelets, and about 20 to 70 percent by weight of aluminum trihydrate particles.

2. The composition of claim 1 in which the glass spheres have an average diameter of about 30 microns and the mica platelets are sized −20+100 mesh.

3. The composition of claim 2 in which the aluminum trihydrate particles are sized −325 mesh.

4. The composition of claim 1 in which the percentage of resin is about 30, the percentage of glass spheres is about 2, the percentage of mica platelets is about 30, and the percentage of aluminum trihydrate particles is about 35.

5. The composition of claim 1 in which the percentage of resin is about 60, the percentage of glass spheres is about 1, the percentage of mica platelets is about 10–20, and the percentage of aluminum trihydrate particles is about 20.

* * * * *